United States Patent
Akhteruzzaman

[19]

[11] Patent Number: 6,128,570
[45] Date of Patent: Oct. 3, 2000

[54] WINDOWED CONTROL SYSTEM

[75] Inventor: Akhteruzzaman, Naperville, Ill.

[73] Assignee: Lucent Technologies Inc., Murray Hill, N.J.

[21] Appl. No.: 09/128,524

[22] Filed: Aug. 3, 1998

[51] Int. Cl.[7] .............................. B60T 8/32; G06F 7/00
[52] U.S. Cl. ........................ 701/93; 180/170; 180/171; 123/352
[58] Field of Search ...................... 701/93, 96, 97, 701/70, 74, 94; 180/171, 170, 179, 177, 176; 123/350, 352, 360, 349, 353; 318/799, 742

[56] References Cited

U.S. PATENT DOCUMENTS

| | | | |
|---|---|---|---|
| 3,887,856 | 6/1975 | Cicchiello | 388/822 |
| 3,946,707 | 3/1976 | Gray | 123/360 |
| 4,374,353 | 2/1983 | Habisohm | 318/799 |
| 4,797,826 | 1/1989 | Onogi et al. | 701/93 |
| 4,961,475 | 10/1990 | Kurihara et al. | 180/179 |
| 5,373,446 | 12/1994 | Mizukoshi | 701/74 |
| 5,417,193 | 5/1995 | Fillman et al. | 123/352 |
| 5,665,026 | 9/1997 | Linden | 477/108 |
| 5,713,428 | 2/1998 | Linden et al. | 180/179 |
| 5,774,820 | 6/1998 | Linden et al. | 701/93 |

*Primary Examiner*—Jacques H. Louis-Jacques
*Attorney, Agent, or Firm*—Sitrick & Sitrick

[57] ABSTRACT

A speed control system for a device includes a microprocessor based module for established a window or speed range having an upper and a lower speed limit. Operator control of the speed of the device is permitted within the window. In a first mode, a windowed comparator is engaged immediately that the device speed attains the lower limit of the established speed range. In a second mode, the device speed must be substantially constant at a speed within the established speed range for a predetermined time before the windowed comparator is engaged.

7 Claims, 2 Drawing Sheets

WINDOWED CONTROL SYSTEM

BACKGROUND OF THE INVENTION

This invention relates generally to speed control systems, such as cruise control systems for vehicles and particularly to a novel speed control system that maintains speed within a selected range of speeds while permitting operator control within the selected range.

The prior art is replete with speed control systems for vehicles, ranging from simple governors to preclude speeds beyond a preset maximum to modern cruise control systems where the vehicle speed is maintained within relatively close tolerances to a particular speed that is determined by the operator. Speed governors have seen very limited service. Conventional cruise controls are robot-like in operation and therefore do not appeal to a great many operators.

A great advantage of cruise control systems is that they avoid the possibility of inadvertent speeding, provided one does not use the accelerator pedal. The disadvantage is that the speed setting may not be comfortable for the operator under varying traffic conditions, with the result that the system may need to be continually disengaged and reengaged by the operator to meet changing traffic conditions.

On modern highways, there is often both a maximum and a minimum posted speed limit, since moving too slowly is also quite dangerous on such roads. It would be of benefit to have a speed control system that would automatically maintain a vehicle speed within a predetermined range of speeds while still permitting operator control of the vehicle speed within the range.

In accordance with the present invention, a plurality of preset speed ranges or windows are provided, one of which may be selected by the operator. Alternatively, the operator may determine a customized speed range or window within which the vehicle speed may be controlled normally with the accelerator pedal. In practice, the speed control system is not engaged until the vehicle has attained a speed corresponding to the lower limit of the selected speed range. Once engaged, the window will not permit vehicle speeds below the lower limit or above the upper limit of the window. Operation of the brake pedal (or turning off the speed control system) immediately disengages the window control and normal operation ensues. Should the operator inadvertently depress the accelerator to an extent that would, under normal conditions, result in a vehicle speed above the established upper limit of the window, the accelerator position is ignored. On the other hand, releasing the accelerator pedal will result in the vehicle speed slowing to the speed corresponding to the established lower limit of the window. In other words, once the vehicle is under window control, the vehicle accelerator pedal is only effective within the window. While the invention is described in connection with a speed control system for a vehicle, it will be appreciated that it is applicable to any device requiring speed control with limited operator intervention. The invention is also not limited to any type of fuel or energy source nor fuel delivery system.

OBJECTS OF THE INVENTION

A principal object of the invention is to provide a novel speed control system.

Another object of the invention is to provide a speed control system that automatically maintains the speed of a device within predetermined upper and lower limits.

A further object of the invention is to provide a speed control system that permits operator control of speed within a preselected window.

BRIEF DESCRIPTION OF THE DRAWINGS

These and other objects and advantages of the invention will be apparent upon reading the following description in conjunction with the drawings in which.

DETAILED DESCRIPTION OF THE PREFERRED EMBODIMENT

Figure 1:
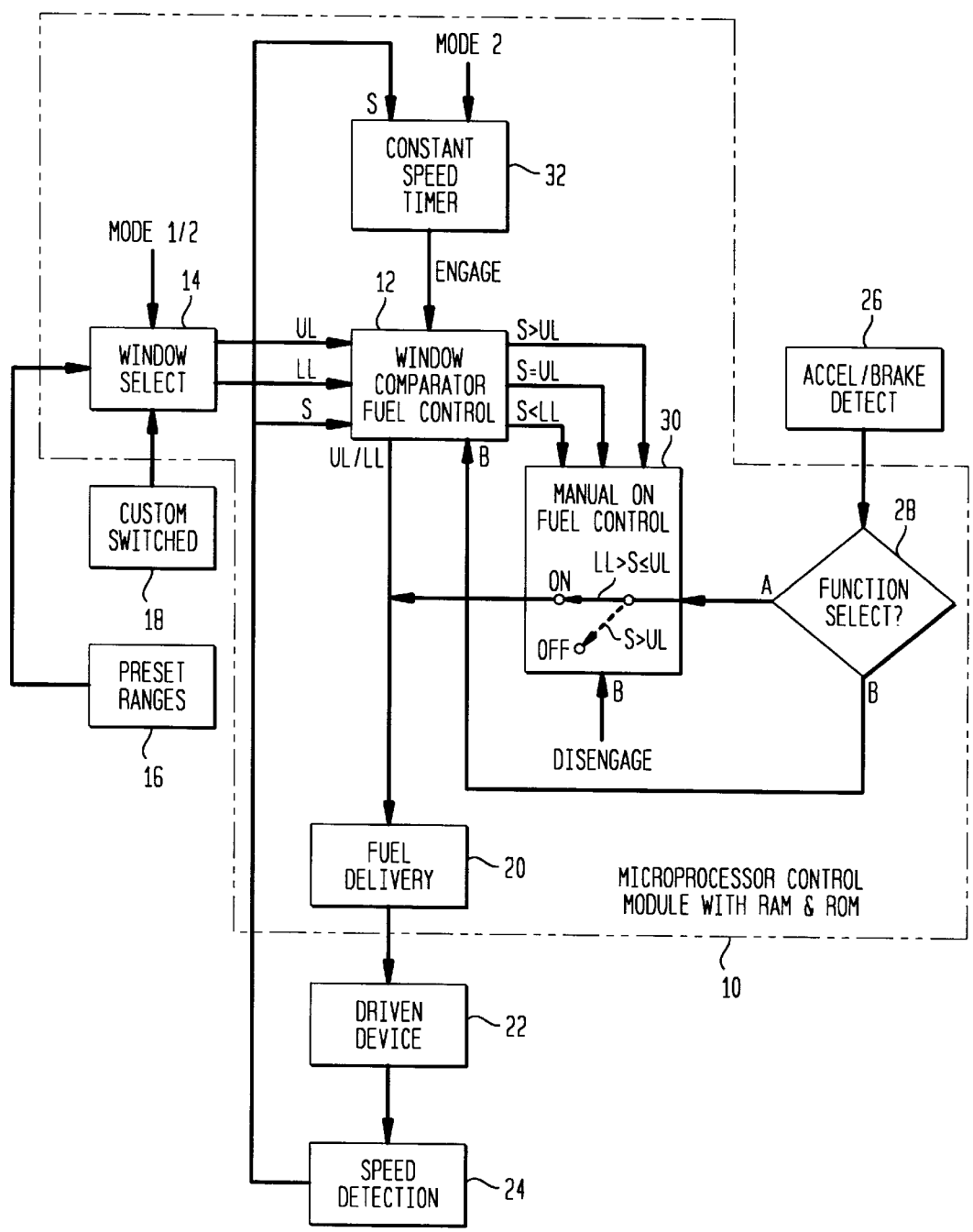
FIG. 1 is a simplified partial schematic diagram of a speed control system according to the invention.

While this invention is susceptible of embodiment in many different forms, there is shown in the drawing, and will be described herein in detail, specific embodiments thereof with the understanding that the present disclosure is to be considered as an exemplification of the principles of the invention and is not intended to limit the invention to the specific embodiments illustrated.

Referring to FIG. 1, the speed control system of the invention includes a microprocessor based control module 10 with a ROM and a RAM. The major functional elements within control module 10 is indicated by the dashed line enclosure. An automatic window comparator fuel control block 12 receives inputs of UL (upper speed limit) and LL (lower speed limit) from a window select block 14. Window select block 14 is enabled by a mode ½ input, the designation indicating that either a mode 1 or a mode 2 input signal will result in enablement. A preset ranges block 16 includes a number of established speed ranges, each with an LL and a UL, from which the operator may choose. Selection may be made by means of suitable push buttons or the like, not shown. The preset speed ranges may, by way of example, comprise one range of from 45 MPH to 65 MPH; a range of from 50 MPH to 60 MPH, etc. Should the operator prefer to establish a different speed range, a custom switches block 18 is provided. Block 18 may include, for example, an up/down switch, a display, an enter switch, for example.

Window comparator 12 outputs LL and UL control signals to a fuel delivery block that controls the supply of fuel to a driven device 22. It will be appreciated that driven device 22 may be any structure that has a operator-controlled speed, with the most common application being a passenger automobile. It will also be recognized that different types of fuel and fuel delivery systems may be employed with equal facility with the invention, the form selected for the purposes of description being a gasoline-powered, fuel injected automobile. A speed detection block 24 develops a signal indicative of the speed of driven device 22 and supplies it to window comparator 12 and to a block 32, identified as a constant speed timer.

An accelerator/brake detector block 26 is provided for supplying signals indicative of the operation of the vehicle's accelerator and brake pedals. A function select block 28 in module 10 develops either an A or a B output signal, responsive to operation of the accelerator and brake pedals, respectively. The B output constitutes an overriding stop signal that immediately disengages window comparator 12 and restores normal fuel control, via the accelerator pedal, by disengaging a manual fuel control block 30. Manual fuel control block 30 receives a number of speed signal inputs from window comparator 12 and an accelerator pedal position signal from function select block 28. The speed control signals are: speed less than the established lower limit for the window comparator (S<LL); speed equal to the established upper limit (S=UL); and speed greater than the upper limit (S>UL). The latter speed input signal is, of course, representative of a spurious condition that might arise while going downhill, for example, since the speed control system normally enforces the upper speed limit UL. Manual fuel control 30 is diagrammatically indicated as a switch with a normal ON position being dictated by the relationship of LL>S<UL. The OFF position is indicated by the dashed line and is dictated by the relationship of S>UL. Therefore, with the speed control system enabled and the window comparator engaged, the vehicle's accelerator pedal is effective for speeds between the limits of LL and UL and ineffective for accelerator positions that would correspond to speeds outside the selected speed range.

An additional feature is that of automatic engagement of the speed control system in response to the vehicle speed remaining at a substantially constant speed within a selected window for a predetermined time. This feature is enabled by a constant speed timer 32 that receives the speed input signal S and is activated by a mode 2 selection signal, as is explained below.

Figure 2:
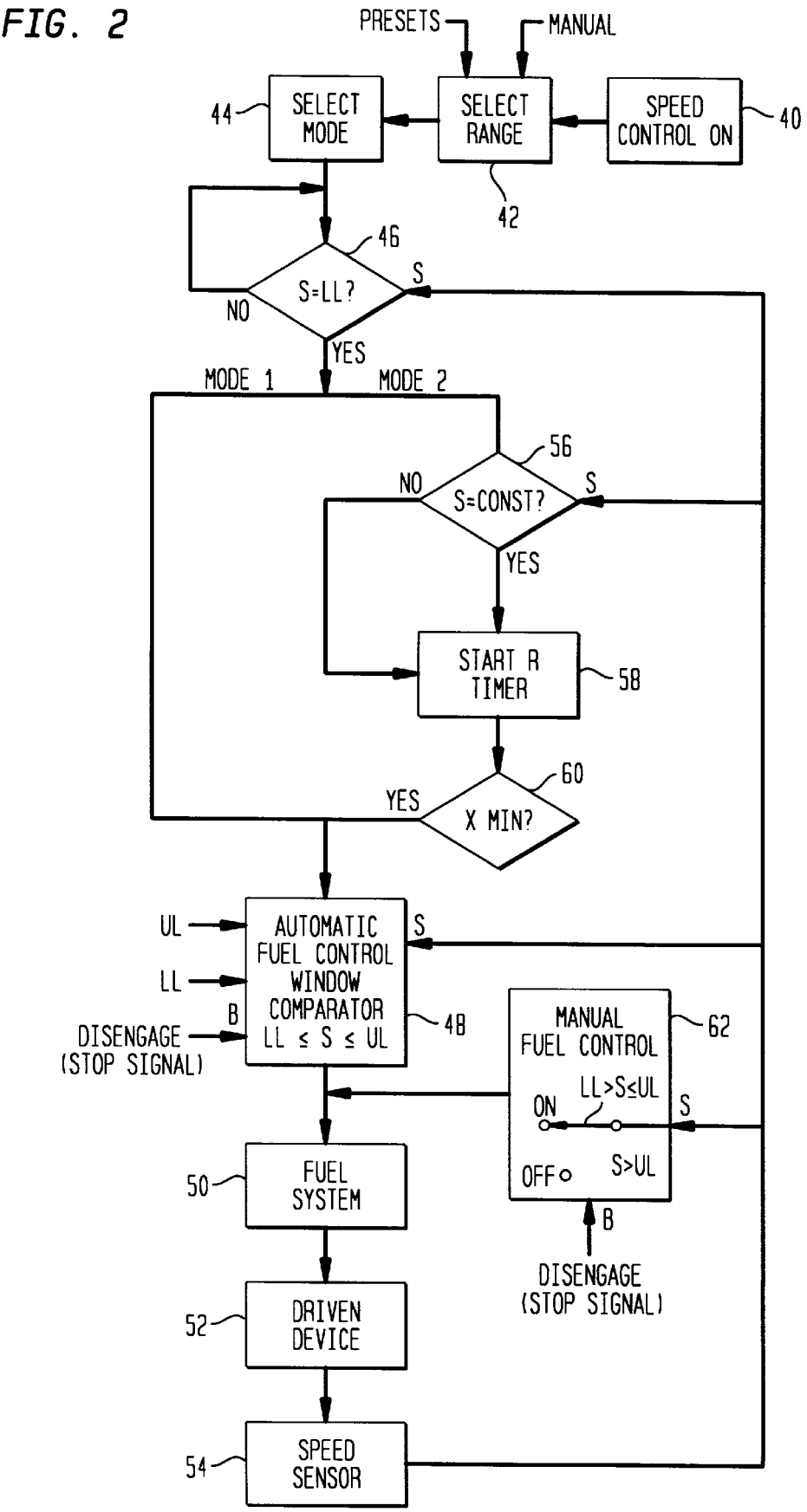
FIG. 2 is a flow chart illustrating operation of the system of FIG. 1.

In operation, and with further reference to the flow chart of FIG. 2, the speed control system of the invention is enabled in step 40. In step 42 the speed range is selected, either by choosing one of the various preset speed ranges or by the operator establishing a custom speed range. In step 44, operator selects the mode of operation of the speed control system. In mode 1, the windowed comparator is engaged when the vehicle speed reaches the lower limit LL of the established speed range, whereas in mode 2, the windowed comparator is engaged only when a substantially constant vehicle speed, within the established window, has been maintained for a feed period of time. In step 46, a determination is made as to whether or not the vehicle speed S is below the lower limit LL of the established window. In mode 1, if the speed is equal to the lower limit LL, the windowed comparator is activated in step 48. Step 50 indicates control of the fuel system responsive to the window comparator and the accelerator pedal (step 62) under the restraints indicated in the respective steps. In steps 52 and 54, the driven device is fueled and its speed detected, respectively.

In mode 2 operation, when S=LL, the windowed comparator is not engaged.

Rather the determination is made in step 56 as to whether the speed is substantially constant. If it is, a timer is started in step 58. If it is not constant, the timer is reset. In step 60, after an elapse of a predefined time (e.g., X minutes), the windowed comparator is engaged and the system operates as described for mode 1. The degree of constancy of the speed, i.e., the variation in speed allowed, and the overall time at a constant speed before engagement of the windowed comparator are matters of design choice and may be incorporated as operator options in the microprocessor based module 10. The stop signal is applied in steps 48 and 62 to disengage the speed control system of the invention.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A method of operating a speed control system comprising the steps of:

establishing upper and lower speed limits;

providing an input indicative of the speed of a device;

comparing the device speed with the established speed limits;

controlling the device to maintain its speed within the established speed limits;

permitting operator control of the device speed within the established speed limits;

disabling the speed control system in response to a stop signal from the operator; and automatically enabling the speed control system responsive to the device speed remaining substantially constant at or above the lower established speed limit for a predetermined period of time.

2. A method of operating a multi mode speed control system comprising the steps of:

establishing a speed range having upper and lower speed limits;

providing an input indicative of the speed of a device;

comparing the input indicative of the device speed with the established speed limits;

maintaining the device speed within the established speed limits;

permitting operator control of the device speed below the established lower speed limit; and in a first mode:
   engaging the speed control system when the device speed reaches the established lower speed limit;
   permitting operator control of the device speed within the established speed limits; and in a second mode:
   automatically enabling the speed control system responsive to the device speed remaining substantially constant at or above the established lower speed limit for a predetermined period of time; and in either the first or the second mode:
   disengaging the speed control system in response to a stop signal from the operator.

3. The method of claim 2, further comprising:

providing a plurality of speed ranges; and in either the first mode or the second mode, enabling selection of the desired one of the plurality of speed ranges.

4. The method of claim 3, further comprising:

providing a microprocessor for:
   controlling operations of the speed control system;
   establishing a plurality of preset speed ranges;
   enabling operator selection among the present speed ranges; and
   enabling an operator customized speed range.

5. A speed control system for a device comprising:

means for controlling the speed of said device;

means for establishing a speed range for said device having upper and lower speed limits, for said device;

means for supplying a signal indicative of the speed of said device;

means for engaging said system when said device speed reaches said lower speed limit;

means for comparing said device speed with said established speed limits; and means for maintaining said device speed within said established speed limits;

means for permitting operator control of the speed of said device within said established speed limits;

means for disengaging said speed control system in response to a stop signal;

a microprocessor for controlling all of said means and for establishing a series of speed ranges, each having upper and lower speed limits;

timer means; and means responsive to said timer means for engaging said speed control system in a selected one of said series of ranges responsive to the speed of said device being substantially constant at or above the lower limit of said selected speed range for a predetermined period of time.

6. The system of claim 5, further comprising:

switch means enabling operator selection among said series of ranges.

7. A speed control system for a device comprising:

means for supplying a signal indicative of the speed of said device;

microprocessor means for:

controlling the speed of said device;

selecting one of a series of ranges, each having upper and lower speed limits;

comparing said device speed with said upper and lower limits in said selected one of said ranges;

maintaining said device speed to maintain it within said selected range;

permitting operator control of the speed of said device within said selected range;

timer means;

means responsive to said timer means for activating said speed control system in a selected one of said series of speed limit ranges responsive to the speed of said device being substantially constant at or above the lower limit of said selected speed range for a predetermined period of time;

means for generating a stop signal; and means for disengaging said speed control system in response to said stop signal.

* * * * *